US012245282B2

(12) United States Patent
Pham Van et al.

(10) Patent No.: US 12,245,282 B2
(45) Date of Patent: Mar. 4, 2025

(54) EARLY TRANSMISSION OF MOBILE-TERMINATED DATA

(71) Applicant: Telefonaktiebolaget LM Ericsson (publ), Stockholm (SE)

(72) Inventors: Dung Pham Van, Upplands Väsby (SE); Andreas Höglund, Solna (SE); Magnus Stattin, Upplands Väsby (SE); Tuomas Tirronen, Helsinki (FI); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 447 days.

(21) Appl. No.: 17/427,307

(22) PCT Filed: Jan. 31, 2020

(86) PCT No.: PCT/IB2020/050807
§ 371 (c)(1),
(2) Date: Jul. 30, 2021

(87) PCT Pub. No.: WO2020/157725
PCT Pub. Date: Aug. 6, 2020

(65) Prior Publication Data
US 2022/0256606 A1 Aug. 11, 2022

Related U.S. Application Data

(60) Provisional application No. 62/798,831, filed on Jan. 30, 2019.

(51) Int. Cl.
*H04W 74/0833* (2024.01)
*H04L 1/08* (2006.01)
(Continued)

(52) U.S. Cl.
CPC ........... *H04W 74/0833* (2013.01); *H04L 1/08* (2013.01); *H04L 5/0053* (2013.01); *H04W 68/005* (2013.01); *H04W 74/04* (2013.01)

(58) Field of Classification Search
CPC ............................... H04L 1/08; H04W 5/0053
See application file for complete search history.

(56) References Cited

U.S. PATENT DOCUMENTS 10,397,958 B2  8/2019  Tsai
2009/0129317 A1*  5/2009  Che ..................... H04L 1/1671
370/328

(Continued)

FOREIGN PATENT DOCUMENTS

EP        2265077 A1    12/2010
WO    2012119626 A1     9/2012
(Continued)

OTHER PUBLICATIONS

3GPP, "3GPP TS 36.321 V14.4.0", 3rd Generation Partnership Project; Technical Specification Group Radio Access Network; Evolved Universal Terrestrial Radio Access (E-UTRA); Medium Access Control (MAC) protocol specification (Release 14), Sep. 2017, 1-108.

(Continued)

*Primary Examiner* — San Htun
(74) *Attorney, Agent, or Firm* — Sage Patent Group

(57) ABSTRACT

A wireless device receives a downlink message from a network node. The wireless device descrambles or decrypts the downlink message, or one or more fields of the downlink message, to obtain one or more parameters. The wireless device uses the one or more parameters to perform at least one action from any one or more of the following actions: receiving a mobile-terminated, MT, early data transmission, EDT, during a random access procedure; positively or (Continued)

negatively acknowledging the MT-EDT; and receiving a re-transmission of the MT-EDT.

16 Claims, 8 Drawing Sheets

(51) Int. Cl.
*H04L 5/00* (2006.01)
*H04W 68/00* (2009.01)
*H04W 74/04* (2009.01)

(56) References Cited

U.S. PATENT DOCUMENTS

| | | | |
|---|---|---|---|
| 2009/0252182 | A1 | 10/2009 | Maheshwari et al. |
| 2010/0272035 | A1 | 10/2010 | Chun et al. |
| 2014/0362794 | A1 | 12/2014 | Zhao et al. |
| 2018/0270698 | A1 | 9/2018 | Babaei et al. |
| 2018/0270854 | A1 | 9/2018 | Lee et al. |
| 2018/0324869 | A1* | 11/2018 | Phuyal ............... H04W 74/0833 |
| 2018/0343673 | A1 | 11/2018 | Chen et al. |
| 2019/0141515 | A1 | 5/2019 | Kim et al. |
| 2019/0159197 | A1* | 5/2019 | Shrestha ............... H04W 72/21 |
| 2019/0215872 | A1* | 7/2019 | Park ................... H04W 52/0216 |
| 2019/0223221 | A1* | 7/2019 | Johansson ............. H04W 76/27 |
| 2020/0037368 | A1 | 1/2020 | Höglund et al. |
| 2020/0053795 | A1* | 2/2020 | Lin ....................... H04L 1/1812 |
| 2020/0187245 | A1* | 6/2020 | Fujishiro ........... H04W 74/0833 |
| 2020/0245370 | A1 | 7/2020 | Höglund et al. |
| 2021/0058213 | A1 | 2/2021 | Zhao et al. |
| 2021/0259024 | A1* | 8/2021 | Wong .................. H04W 74/006 |
| 2021/0352617 | A1 | 11/2021 | Choe et al. |

FOREIGN PATENT DOCUMENTS

| | | |
|---|---|---|
| WO | 2014018333 A2 | 1/2014 |
| WO | 2020091685 A1 | 5/2020 |

OTHER PUBLICATIONS

3GPP, "3GPP TS 36.300 V14.4.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Sep. 2017, 1-329.
3GPP, "3GPP TS 36.321 V15.4.0", 3rd Generation Partnership Project; Technical Specification Group Radio Access Network; Evolved Universal Terrestrial Radio Access (E-UTRA); Medium Access Control (MAC) protocol specification (Release 15), Dec. 2018, 1-131.
3GPP, "3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.4.0, Sep. 2017, 1-43.
3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.4.0, Sep. 2017, 1-753.
3GPP, "3rd Generation Partnership Project; Technical Specification Group Radio Access Network; Evolved Universal Terrestrial Radio Access Network (E-UTRAN); S1 Application Protocol (S1AP) (Release 14)", TS 36.413 V14.4.0, Sep. 2017, 1-353.
3GPP, "3rd Generation Partnership Project; Technical Specification Group Services and System Aspects; 3GPP System Architecture Evolution (SAE); Security architecture (Release 15)", 3GPP TS 33.401 V15.1.0, Sep. 2017, 1-161.
Unknown, Author, "Analysis of Downlink EDT options", 3GPP TSG RAN WG2 Meeting #103bis; R1-1817045; Spokane, USA; Nokia, Nokia Shanghai Bell, Nov. 12-16, 2018, pp. 1-8.
Unknown, Author, "MT-initiated DL EDT", 3GPP TSG-RAN WG2 Meeting #104; R2-1817910; Spokane, USA; Qualcomm Incorporated, Nov. 12-16, 2018, pp. 1-8.

* cited by examiner

EARLY TRANSMISSION OF MOBILE-TERMINATED DATA

RELATED APPLICATIONS

The present application claims the benefit of U.S. Provisional Application Ser. No. 62/798,831, filed Jan. 30, 2019, the entire contents of which is incorporated herein by reference.

TECHNICAL FIELD

The present application relates generally to a wireless communication network, and relates more particularly to early transmission of mobile-terminated data in such a network.

BACKGROUND

Conventionally, a wireless device performs a random access procedure with a wireless communication network in order to establish a connection with the network and/or acquire uplink timing alignment. After performing the random access procedure, the wireless device may then transmit data to and/or receive data from the network, e.g., in the form of user data or application-layer data. This conventional approach is suited particularly well for large and/or frequent data transmissions.

FIG. 1 shows one example of a contention-based random access procedure in a Long Term Evolution (LTE) network, as described in the 3rd Generation Partnership Project (3GPP) Technical Specification (TS) 36.300 v14.4.0. As shown in FIG. 1, there are four steps of the contention based random access procedure. In the first step, a Random Access (RA) Preamble is transmitted on a Random Access Channel (RACH) in the uplink. The Random Access Preamble is commonly referred to as being transmitted in message 1 (Msg1). In the second step, a Random Access Response (RAR) generated by the Medium Access Control is transmitted on the Downlink Shared Channel. The RAR may be addressed to Random Access Radio Network Temporary Identifier RNTI (RA-RNTI) on the Physical Downlink Control Channel (PDCCH). The RAR may convey at least RA-preamble identifier, Timing Alignment information, initial uplink (UL) grant and assignment of Temporary Cell RNTI (C-RNTI) (which may or may not be made permanent upon Contention Resolution). The RAR is commonly referred to as being transmitted in message 2 (Msg2).

In the third step, the first scheduled Uplink (UL) transmission is sent on the Uplink Shared Channel (UL-SCH). For initial access, the scheduled UL transmission conveys the Radio Resource Control (RRC) Connection Request generated by the RRC layer and transmitted via Common Control Channel (CCCH) and conveys at least a Non-Access Stratum (NAS) user equipment (UE) identifier but no NAS message. This first transmission is commonly referred to as the transmission of message 3 (Msg3). In the fourth step, Contention Resolution on the downlink occurs. Early contention resolution shall be used, i.e. eNB does not wait for NAS reply before resolving contention. This fourth step is commonly referred to as the transmission of message 4 (Msg4).

An approach referred to as early data transmission (EDT), by contrast, enables the wireless device to transmit and/or receive data earlier than conventional. With EDT, for example, the wireless device may transmit and/or receive data during or even before the random access procedure, rather than only after the random access procedure completes. This EDT approach proves especially advantageous for small and/or frequency data transmissions. In these and other cases, EDT may reduce control signalling overhead attributable to connection establishment, improve device battery life, and/or reduce data latency.

Reduction of control signaling overhead via EDT may prove particularly useful for Machine-to-Machine (M2M) and/or Internet of Things (IoT) related use cases. One objective here is to reduce UE power consumption and latency through introducing possibilities to send data as early as possible during the Random Access procedure. Existing EDT solutions support transmission of data in Msg3 only, or in Msg4 only, or in both Msg3 and Msg4. And existing EDT solutions only support mobile-originated (MO) calls. Support for mobile-terminated (MT) early data transmission would advantageously improve downlink transmission efficiency and/or UE power consumption. MT-EDT in this regard would be used for downlink (DL) user data, i.e. not for NAS signaling, which can be transmitted in one transport block.

The first opportunity for transmission of MT DL data to the UE is in the paging message. But transmitting the MT DL data at this first opportunity may incur a large waste of radio and core network resources in a cell and/or tracking area(s) since it requires transmission of DL data to a single UE with unnecessarily large paging load, in a cell and/or all cells that belong to the same tracking area(s). In addition, UEs that share the same paging occasion in a cell may need to decode the large paging message unnecessarily. A slightly different version of the mechanism described above is to schedule the MT DL data in the paging message (e.g., put a DL grant for the MT DL data in the paging message) rather than providing the MT DL data itself in the paging message. This option means a similar amount of resources would still be used, but the impact on the UE power consumption due to other UEs' attempts to decode the message would be less. Another version of the paging-based MT-EDT is to schedule DL data rather than a paging message in a paging occasion. Yet another opportunity for transmission of MT DL data is in Msg2. However, protected radio resource control (RRC) signalling and/or non-access stratum (NAS) signalling during and after the random access procedure.

Generally, then, protected radio resource control (RRC) signalling and/or non-access stratum (NAS) signalling during and after the random access procedure secures conventional data transmissions that occur after the random access procedure. Transmitting the data earlier in time, within or before the random access procedure itself, therefore threatens to jeopardize the security of EDT.

SUMMARY

Some embodiments herein advantageously secure early data transmission (EDT) from a network node to a wireless device. In one or more embodiments, for example, the network node scrambles or encrypts a downlink message, or one or more fields of the downlink message, indicating one or more parameters. The wireless device correspondingly descrambles or decrypts the downlink message, or the one or more fields of the downlink message, to obtain the one or more parameters. The one or more parameters may be usable by the wireless device to receive an EDT (e.g., a mobile-terminated, MT, EDT) during a random access procedure, to positively or negatively acknowledge the EDT, and/or to receive a retransmission of the EDT. Regardless, the scrambled or encrypted nature of the downlink message or field(s) of the downlink message advantageously protects the parameter(s) from being revealed to attackers and interfering with the EDT, its acknowledgement, and/or its retransmission.

In some embodiments, for example, the downlink message is a paging message and the parameter(s) include an identifier of a contention-free random access preamble. In these and other embodiments, the wireless device may transmit the identified contention-free random access preamble to the network node as an acknowledgement of the EDT. Because the identifier of that preamble was protected by the scrambling or encrypting of the downlink messages or its field(s), some embodiments advantageously prevent an attacker from eavesdropping on the indicated preamble identifier. These embodiments may thereby prevent such an attacker from maliciously transmitting the identified preamble so as to make the network believe the intended device successfully received the EDT, e.g., no matter whether the intended device really received the EDT successfully.

More particularly, embodiments herein include a method performed by a wireless device in accordance with particular embodiments. The method may include receiving a downlink message from a network node. The method may also include descrambling or decrypting the downlink message, or one or more fields of the downlink message, to obtain one or more parameters. In some embodiments, the method further includes using the one or more parameters to perform at least one action from any one or more of the following actions: receiving a mobile-terminated, MT, early data transmission, EDT, during a random access procedure; positively or negatively acknowledging the MT-EDT; and receiving a re-transmission of the MT-EDT.

Embodiments herein also include a method performed by a network node in accordance with other particular embodiments. The method may include scrambling or encrypting a downlink message, or one or more fields of the downlink message, indicating one or more parameters. The method may also include, after the scrambling or encrypting, transmitting the downlink message from the network node to the wireless device. In some embodiments, the method further includes using the one or more parameters to perform at least one action from any one or more of the following actions: transmitting a mobile-terminated, MT, early data transmission, EDT, from the network node to the wireless device during a random access procedure; receiving from the wireless device positive or negative acknowledgement of the MT-EDT; and re-transmitting the MT-EDT to the wireless device.

Embodiments herein further include corresponding apparatus, computer programs, and carriers such as non-transitory computer-readable mediums. For example, embodiments herein include a wireless device. The wireless device may be configured (e.g., via communication circuitry and processing circuitry) to receive a downlink message from a network node. The wireless device may also be configured to descramble or decrypt the downlink message, or one or more fields of the downlink message, to obtain one or more parameters. In some embodiments, the wireless device further is configured to use the one or more parameters to perform at least one action from any one or more of the following actions: receiving a mobile-terminated, MT, early data transmission, EDT, during a random access procedure; positively or negatively acknowledging the MT-EDT; and receiving a re-transmission of the MT-EDT.

Embodiments herein also include a network node. The network node may be configured (e.g., via communication circuitry and processing circuitry) to scramble or encrypt a downlink message, or one or more fields of the downlink message, indicating one or more parameters. The network node may also be configured to, after the scrambling or encrypting, transmit the downlink message from the network node to the wireless device. In some embodiments, the network node is further configured to use the one or more parameters to perform at least one action from any one or more of the following actions: transmitting a mobile-terminated, MT, early data transmission, EDT, from the network node to the wireless device during a random access procedure; receiving from the wireless device positive or negative acknowledgement of the MT-EDT; and re-transmitting the MT-EDT to the wireless device.

DETAILED DESCRIPTION

Figure 1:
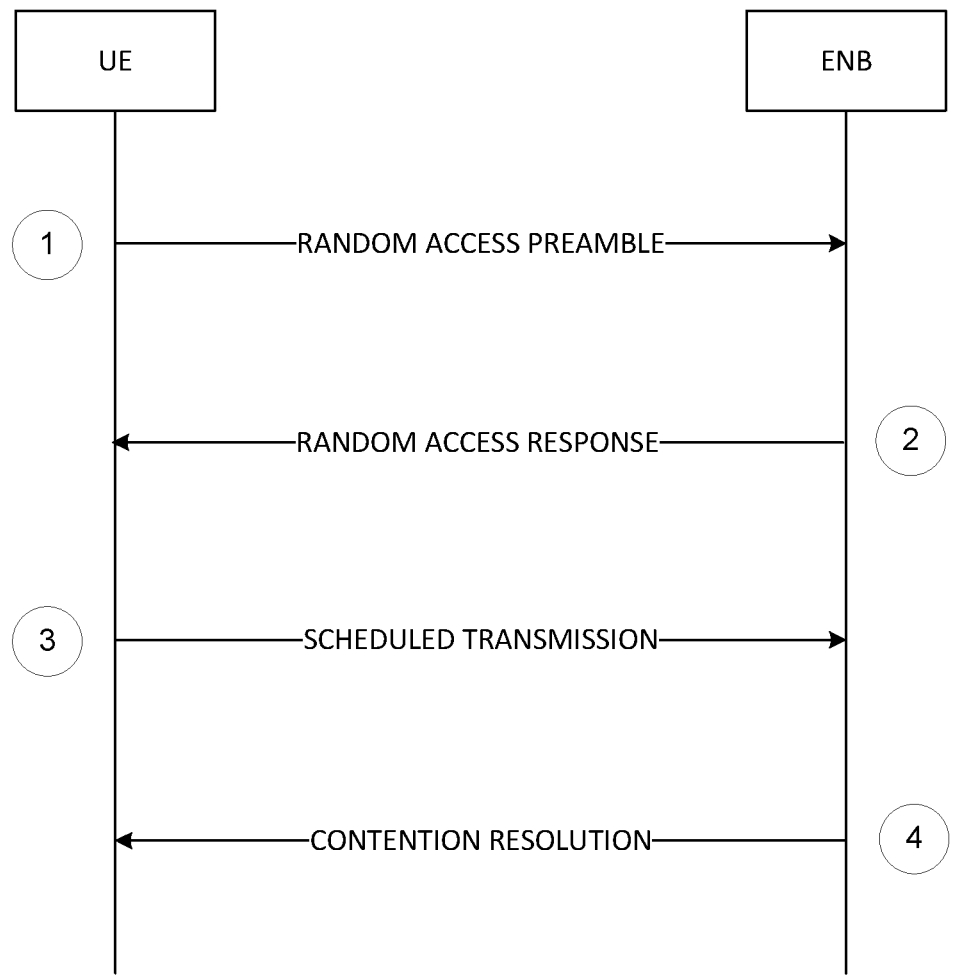
FIG. 1 is a call flow diagram of a contention-based random access procedure according to some embodiments.
Figure 2:
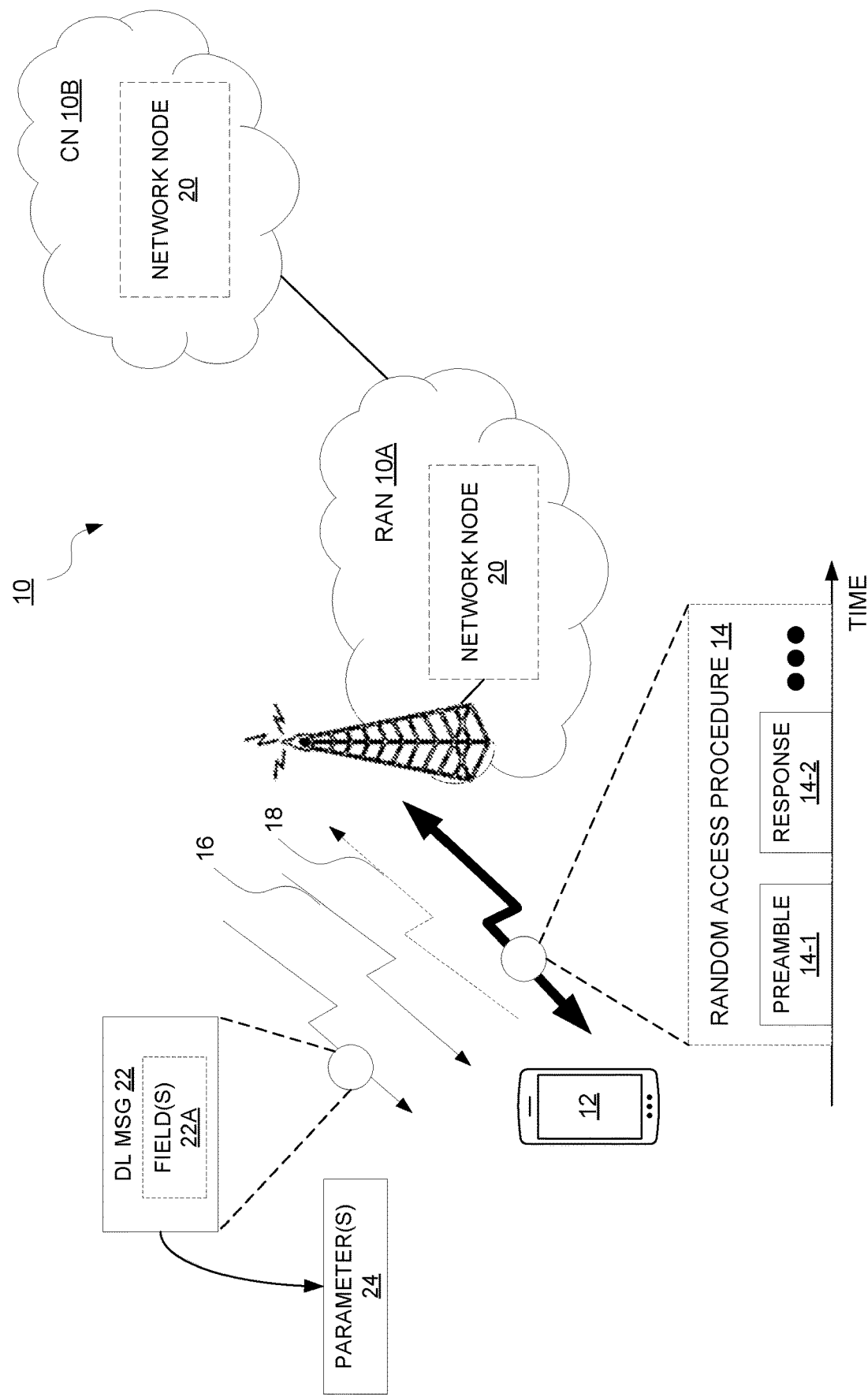
FIG. 2 is a block diagram of a wireless communication network according to some embodiments.

FIG. 2 shows a wireless communication network 10 according to some embodiments. The network 10 may for instance be a Long Term Evolution (LTE), Narrowband Internet of Things (NB-IoT), and/or 5th Generation/New Radio (NR) network. The network 10 comprises a radio access network (RAN) 10A and a core network (CN) 10B. The RAN 10A provides radio access to a wireless device 12 and connects the wireless device 12 to the CN 10B, which may in turn connect the device 12 to one or more other networks (e.g., the Internet).

The wireless device 12 is configured to perform a random access procedure 14 in order to establish a connection (e.g., a radio resource control, RRC, connection) with the RAN 10A and/or to acquire uplink timing alignment. As shown, for example, this may involve the wireless device 12 transmitting a random access preamble 14-1 (also referred to as message 1, msg1), e.g., on a random access channel. The procedure 14 may also involve the wireless device 12 receiving a random access response 14-2 (also referred to as message 2, msg2) if the preamble 14-1 was successfully received by the RAN 10A. In some embodiments, the random access procedure 14 may be contention-free such that no contention between devices needs to be resolved. In this case, the random access preamble 14-1 may be a contention-free random access (CFRA) preamble (e.g., assigned specifically to the wireless device 12) and the random access procedure 14 may end with the random access response 14-2.

The wireless device 12 is also configured to receive a so-called early data transmission (EDT) 16, which may be a mobile terminated (MT) EDT. The EDT 16 may for instance convey user data or application-layer data to the wireless device 12, e.g., as opposed to control signalling. The wireless device 12 may receive the EDT 16 earlier than conventional, by receiving the EDT 16 during or even before the random access procedure 14. In fact, the wireless device 12 in some embodiments may receive the EDT 16 when or before the device 12 receives the random access response 14-2. For example, in some embodiments, the wireless device 12 may receive the EDT 16 in, or in association with, the random access response 14-2. In other embodiments, the wireless device 12 may receive the EDT 16 before the device 12 transmits the preamble 14-1. In one such embodiment, for instance, the wireless device 12 may receive the EDT 16 in a paging message for the EDT 16 or as scheduled by scheduling information in the paging message.

FIG. 2 also shows that, in some embodiments, the wireless device 12 positively or negatively acknowledges the EDT 16, e.g., by transmitting an acknowledgement 18. For example, in embodiments where the wireless device 12 receives the EDT 16 before transmitting the preamble 14-1, the preamble 14-1 may serve or otherwise function as the acknowledgement 18. In these and other embodiments, the wireless device 12 may correspondingly receive a re-transmission of the EDT 16 (not shown), e.g., if the device 12 negatively acknowledges the EDT 16.

Some embodiments herein advantageously secure the EDT 16, acknowledgement 18 of the EDT 16, and/or retransmission of the EDT 16, e.g., in the sense that the embodiments protect the EDT, acknowledgement, and/or retransmission to some extent from an attacker. One or more embodiments, for example, do so by securing or protecting parameter(s) 24 (e.g., preamble identifier, Radio Network Temporary Identifier (RNTI), etc.) that are usable/used for controlling or performing the EDT 16, acknowledgement 18, and/or retransmission. In some embodiments, the parameter(s) 24 are secured or protected by being independently generated by the wireless device 12 and a network node 20, e.g., based on a shared secret or key. In other embodiments, the parameter(s) 24 are secured or protected by being securely transmitted from the network node 20 to the wireless device 12, e.g., even without or before protected Radio Resource Control (RRC)/Non-Access Stratum (NAS) signalling in some embodiments.

In one or more embodiments shown, for example, the network node 20 (e.g., in the RAN 10A or CN 10B) transmits a downlink message 22 (e.g., a paging message) to the wireless device 12. The downlink message 22 includes one or more fields 22A. The downlink message 22, e.g., via the one or more fields 22A, indicates the one or more parameters 24. The one or more parameters 24 are usable by the wireless device to receive the EDT 16, to acknowledge the EDT 16, and/or to receive a retransmission of the EDT 16.

In some embodiments, the field(s) 22A or message 22 comprising the one or more parameters 24 may be provided, for example: (i) with dedicated signaling in a previous time in RRC Connected state; (ii) with paging (e.g., in the paging message, which may be referred to as message 0); (iii) in a random access response (RAR) (which may also be referred to as message 2 in the random access procedure); (iv) in a DL transmission indicated in a random access response (RAR); or (v) together/in conjunction/multiplexed with the DL data transmission 16.

Regardless, the downlink message 22 or one or more fields 22A of the downlink message 22 are notably scrambled or encrypted according to some embodiments. For example, the scrambling or encryption may be performed based on security material, or a security context, shared between the wireless device 12 and the network node 20. No matter the particular way the scrambling or encryption is performed, the wireless device correspondingly descrambles or decrypts the downlink message 22, or the one or more fields 22A of the downlink message 22, to obtain the one or more parameters 24. The scrambled or encrypted nature of the downlink message 22 or field(s) 22A of the downlink message 22 advantageously protects the parameter(s) 24 from being revealed to attackers that could exploit the parameter(s) 24 to interfere with the EDT 16, its acknowledgement, and/or its retransmission.

Note that the scrambling/descrambling or encryption/decryption scheme can be symmetric or asymmetric comprising a component of information not available to unauthorized nodes or devices. The information not available to unauthorized devices or nodes may be based on shared secret(s)/key(s) or private key(s). Derivation of information not available to unauthorized devices or nodes may take additional input, e.g., to provide freshness to protect against replay. Information not available to unauthorized devices or nodes may be derived from existing information; e.g., from AS or NAS security material, e.g., KeNB or K_RRCINT associated with a source or target node.

Figure 3:
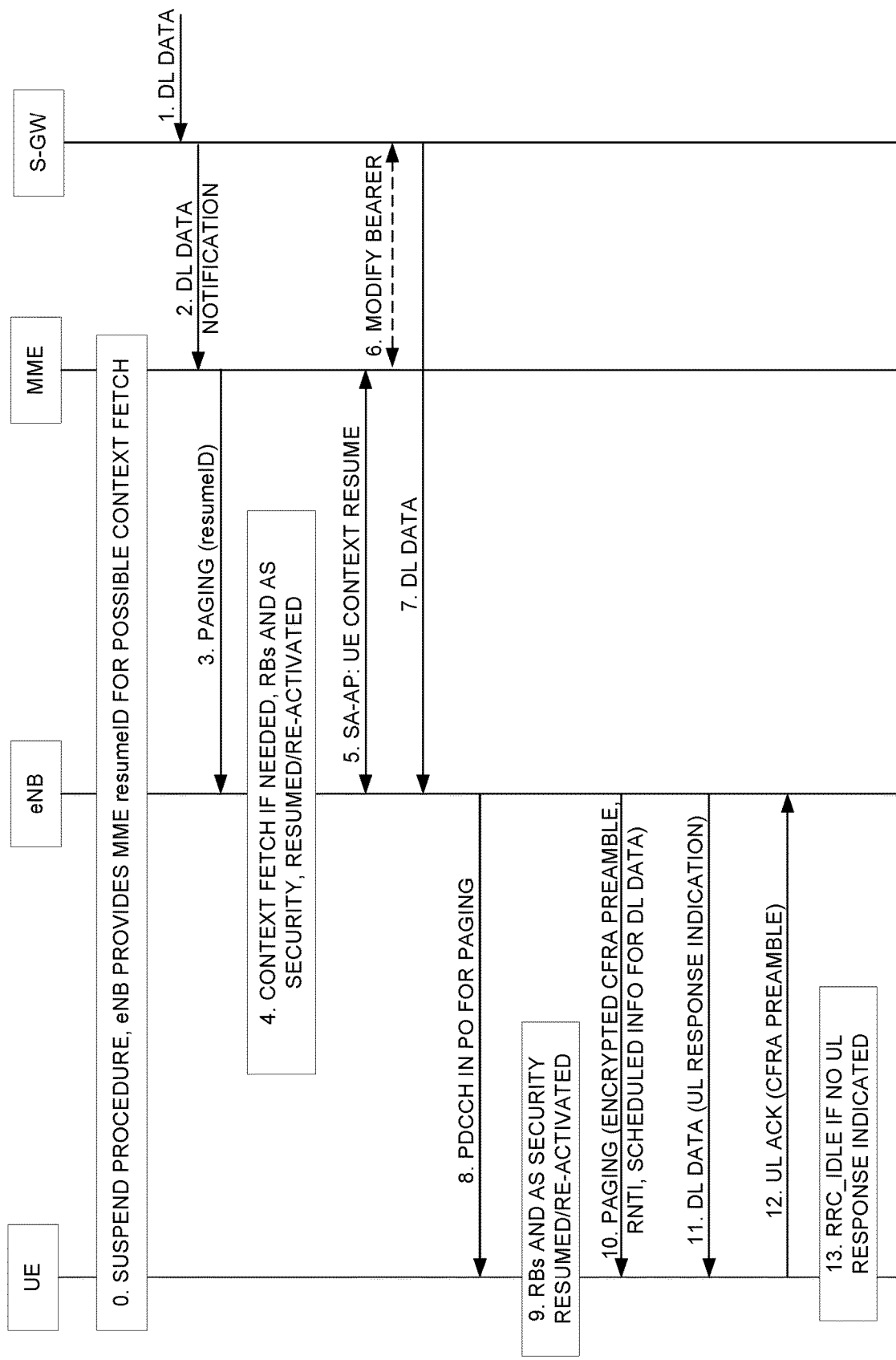
FIG. 3 is a call flow diagram of a procedure for early data transmission according to some embodiments.
Figure 4:
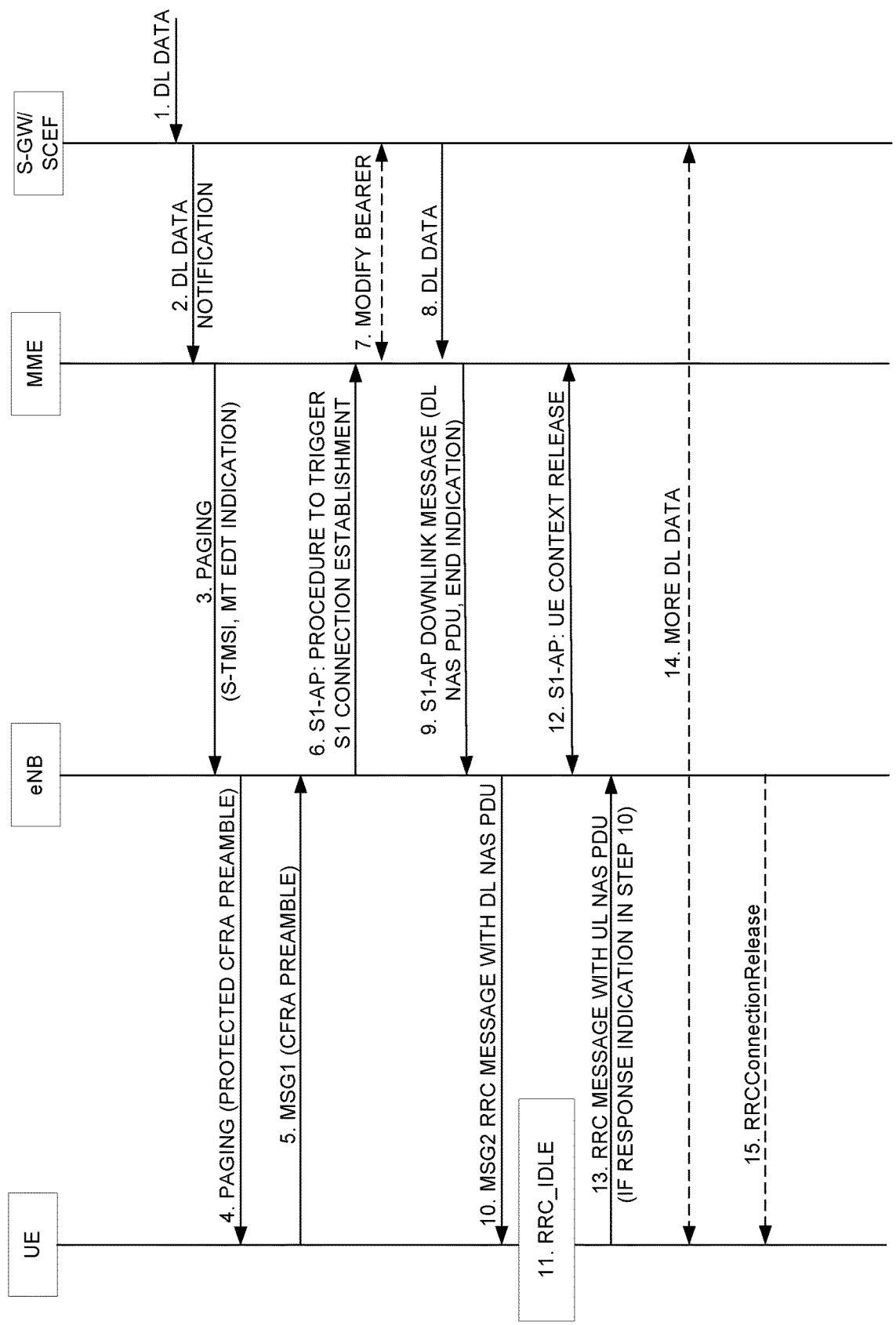
FIG. 4 is a call flow diagram of a procedure for early data transmission according to other embodiments.

In any event, the downlink message 22 in some embodiments is a paging message and the parameter(s) 24 include an identifier of a contention-free random access preamble. In these and other embodiments, the wireless device 12 may transmit the identified contention-free random access preamble 14-1 as an acknowledgement of the EDT 16. Because the identifier of that preamble 14-1 was protected by the scrambling or encrypting of the downlink message 22 or its field(s) 22A, some embodiments advantageously prevent an attacker from eavesdropping on the indicated preamble identifier. The embodiments for example prevent a malicious wireless device, which either has the same paging occasion (PO) or that is monitoring all paging POs, from seeing the paging message, getting the contention-free random access preamble, and sending the contention-free random access preamble back to the network (e.g., as a PRACH transmission) as if it was the intended wireless device. These embodiments may thereby prevent such an attacker from maliciously transmitting the identified preamble so as to make the network believe the intended device 12 successfully received the EDT 16, e.g., no matter whether the intended device really received the EDT successfully. The network (e.g., Mobility Management Entity or eNB) can thereby know that the downlink data was successfully delivered to the intended wireless device. Moreover, these embodiments advantageously prevent such an attach without requiring further uplink transmission from the wireless device to authenticate the preamble sender, which would negatively affect the wireless device's battery life. FIGS. 3 and 4 show concrete examples of such an embodiment in which the paging message encrypts or otherwise protects the CFRA preamble assigned to the device.

In particular, FIG. 3 shows an example signaling flow for the secure transmission of MT DL data scheduled in paging for a user plane (UP) solution, according to some embodiments. In the UP solution, the UE is allowed to resume a previously stored RRC connection (thus also known as RRC Suspend/Resume). As shown, the paging message in Step 10 includes or otherwise indicates an encrypted CFRA preamble. The UE performs decryption to determine the CFRA preamble that the UE then uses in Step 12 to send the UL ACK.

FIG. 4 shows another example signaling flow for the secure transmission of MT DL data after preamble for a control plane (CP) solution, according to alternative or additional embodiments. In the CP solution, the transmission of user plane data is allowed over the NAS (also known as Data over NAS, DoNAS). As shown, the paging message in Step 4 includes or otherwise indicates a protected CFRA preamble, e.g., protected in the sense of being encrypted or scrambled. The UE recovers the CFRA preamble from the paging message and correspondingly transmits the CFRA preamble in MSG1 in Step 5.

The parameter(s) 24 may nonetheless generally include a parameter which the wireless device 12 shall use for transmission on a Physical Random Access Channel (PRACH). As described above, the parameter(s) 24 may indicate which random access preamble the wireless device 12 shall use when performing a random access on PRACH. Alternatively or additionally, the parameter(s) 24 may be used for scrambling of transmission on and/or information transmitted on PRACH. The parameter(s) 24 may be, e.g., a random access preamble identifier (RAPID). The parameter(s) 24 may each be a value or index. The value or index may be used directly or the value or index may be used to determine/derive security material (e.g., key, sequence number or algorithm) for protection of transmission on PRACH. In some embodiments, the transmission on PRACH may be considered acknowledgement of reception of DL data.

Alternatively or additionally, the parameter(s) 24 may include a parameter which the wireless device 12 shall use for transmitting a Physical Uplink Control Channel (PUCCH) and/or a Physical Uplink Shared Channel (PUSCH). The parameter(s) 24 may be used for scrambling of UL transmission on and/or information transmitted on PUCCH and/or PUSCH. The parameter(s) may be used for describing/indicating properties of/resources for PUCCH and/or PUSCH. The parameter(s) 24 may be, e.g., a RNTI. The parameter(s) may each be a value or index. The value or index may be used directly or the value or index may be used to determine/derive security material (e.g., key, sequence number or algorithm) for protection of transmissions on PUCCH and/or PUSCH. The transmission on PUCCH and/or PUSCH may, e.g., be an ACK (acknowledging reception of DL data) or a NACK (indicating unsuccessful reception/need for retransmission). As nonlimiting examples, ACK/NACK may be in the form of Hybrid Automatic Repeat Request (HARQ) feedback, MAC control element, Radio Link Control (RLC) Status Report or other Layer 1 (L1), Layer 2 (L2) or Layer 3 (L3) signaling.

Alternatively or additionally, the parameter(s) 24 may include a parameter which the wireless device 12 shall use for receiving a Physical Downlink Control Channel (PDCCH) and/or a Physical Downlink Shared Channel (PDSCH). The parameter(s) 24 may be used for scrambling/descrambling of the transmission on and/or information transmitted/received on PDCCH and/or PDSCH. The parameter(s) 24 may be used for describing/indicating properties of/resources for PDCCH and/or PDSCH. The parameter(s) 24 may be, e.g., a RNTI or a RAPID. The parameter(s) 24 may each be a value or index. The value or index may be used directly or the value or index may be used to determine/derive security material (e.g., key, sequence number or algorithm) for protection of transmissions on PDCCH and/or PDSCH. The reception of PDCCH and/or PDSCH may be for receiving DL data. The transmission on PDCCH may be for scheduling of transmission on PUSCH where the transmission on PUSCH may be to acknowledge reception of DL data or to indicate unsuccessful reception of DL data or need for retransmission of DL data.

More particularly, in MT-EDT before Msg4 options, a RNTI may be provided in a paging message that can be used for possible retransmissions of DL data. Some embodiments protect the RNTI in that case. Alternatively or additionally, in some embodiments, a CFRA preamble needs to be assigned to the wireless device 12 as part of the paging message so that it can be used as an ACK transmission in the UL, and DL data does not need to be retransmitted in case of unsuccessful contention resolution (also for a solution that transmits DL data after the preamble, it is needed by the eNB to transmit the DL data to the intended wireless device). Some embodiments alternatively or additionally protect the CFRA preamble (protecting the information on which (CFRA) preamble the wireless device 12 should use) in that case. This may advantageously guard against an unauthorized wireless device monitoring the same paging occasion (PO) in order to receive the paging message and send the network an ACK via PRACH transmission.

In one embodiment, the RNTI provided in the paging message can be protected using a predefined secret ID. Then, the secret ID can be defined based on some security method. For example, the secret ID can be in an encrypted form in the paging message using a pre-negotiated security material that allows only the wireless device 12 and network to encode/decode the ID. Or, the secret ID can be one of the keys used for Access Stratum (AS) or Non-Access Stratum (NAS) security.

In another embodiment, the CFRA preamble provided in the paging message can be protected using a predefined secret ID which is based on some security method similar to the case for RNTI above. The secret ID can be a scrambled preamble identifier which is computed based on a predefined function that converts a CFRA preamble index A to another CFRA preamble index B so that it is harder for attackers to guess the actual CFRA preamble index by reading the paging message. For example, the eNB intends to provide the wireless device 12 with a CFRA preamble with index N. However, instead of including N in the paging message, it sends another CFRA preamble with index N+j in the paging message. In this case, both wireless device 12 and network know j in advance.

In one embodiment, the CFRA preamble provided in a paging message can be protected using NAS/AS security context stored at the wireless device 12 and network (e.g. MME, and eNB in CP and UP solution, respectively). Note that while NAS security context is always active, for the UP solution, the wireless device 12 in idle mode with suspend indication needs to activate AS security before processing/deciphering the received paging message/ciphered part to decode the CFRA preamble. Note that while NAS security can be used for both CP and UP solutions in this context, AS security applies only to the UP solution.

In one embodiment, the wireless device 12 is provided with an encrypted ID in a paging message. The UE then scrambles the CFRA preamble transmission using the ID (either in an encrypted form or without encryption). As mentioned above, the encryption of the ID in the paging message can be done using NAS or AS security context, respectively.

In one embodiment, the UL ACK in response to the DL data transmission can be scrambled with a newly predefined UE-specific identity, e.g., Y-RNTI. UL ACK can be a CFRA PRACH transmission in case of paging-based MT-EDT (DL data transmission in/scheduled with paging or scheduled during paging occasion) or a UL transmission in response to DL data in Msg2 in case of MT DL data after preamble. The Y-RNTI can be assigned to the wireless device 12 protected in the paging message or assigned to the wireless device 12 in advance (before paging). In some embodiments, the Y-RNTI is not used to schedule UL transmission but only to scramble UL ACK for security purposes. In some embodiments, Y-RNTI can be computed using a predefined function.

In another embodiment, an MT-EDT Paging RNTI (P-RNTI) can be defined so that a wireless device can distinguish the legacy paging from the MT-EDT paging. In addition, this newly defined MT-EDT P-RNTI can be used to scramble the whole paging message (rather than encrypting each field/parameter in paging message with a separate UE ID). The wireless device can descramble the paging message using this predefined MT-EDT P-RNTI to get its Serving Temporary Mobile Subscriber Identity (S-TMSI) and other information in the MT-EDT paging message. Using this MT-EDT P-RNTI also helps avoid the confusion to legacy wireless devices that can only understand the legacy paging by using P-RNTI for descrambling the received paging message. That means there is no need for an explicit MT-EDT indication, for example, in the paging message.

In an alternative embodiment, the paging record is ciphered in the paging message, e.g. using existing keys for NAS or AS security depending on whether CP or UP solution is used, such that it can only be read by the wireless device whose UE_ID (S-TMSI) matches with the one that the paging message contains. The paging records in some embodiments have a constant length for other wireless devices to skip past and read the following paging records. Alternatively, S-TMSI is not ciphered as in legacy but the remaining part of the paging record is, e.g. indication for MT-EDT if it is explicit, reserved (CFRA) preamble to be used in Msg1 if the DL data is to be transmitted in Msg2.

In yet an alternative embodiment the wireless device 12 is provided with a device-specific MT-EDT P-RNTI.

In view of the above, some examples for secure/reliable transmission of MT DL data earlier than (before) Msg4 during the RA procedure include: (i) protection of the ID provided in paging which is used to scramble the UL ACK transmission; (ii) protection of the CFRA preamble provided in paging using established security context or a secret key; and/or (iii) protection of the CFRA PRACH transmission by scrambling with a secret key provided in paging or provided in advance.

Generally, then, these and other embodiments may provide a method/solution with which control signaling is protected using a secret so that an unauthorized device or node cannot easily deny a legitimate wireless device service by falsely acknowledging successful reception of MT EDT and/or make the network direct DL transmission to where the legitimate UE cannot receive it. Alternatively or additionally, these and other embodiments may enable secure MT EDT in/scheduled with paging or Msg2 in the contention-free random-access procedure. For example, some embodiments enable secure early transmission of MT DL data using a MT-EDT method with reduced signaling, i.e., MT DL data before Msg4 in the RA procedure. Alternatively or additionally, some embodiments solve the problem of how to improve security for Rel-16 MT-EDT with DL data transmission in or scheduled with paging message or with Msg2 in contention-free random access procedure. This is in context of CP and UP MT-EDT considered for LTE, NB-IoT, and/or 5G/NR.

Certain embodiments may provide one or more of the following technical advantage(s). Some embodiments enable secure early transmission of MT DL data earlier than Msg4 with reduced/minimal signaling exchange required between the UE and the network. Alternatively or additionally, some embodiments enable secure/reliable association and/or authentication of UE with DL data transmission before or without integrity protected UL RRC or NAS signaling which is typically not available before Msg3 or Msg4. Alternatively or additionally, some embodiments protect against an unauthorized device or node denying a legitimate UE service by falsely acknowledging successful reception of MT EDT and/or making the network direct a DL transmission to where the legitimate UE cannot receive it. This is for both CP and UP Cellular Internet of Things (CIoT) Evolved Packet System (EPS) optimization solutions. Some embodiments therefore help to further improve the UE battery life in EDT.

Figure 5:
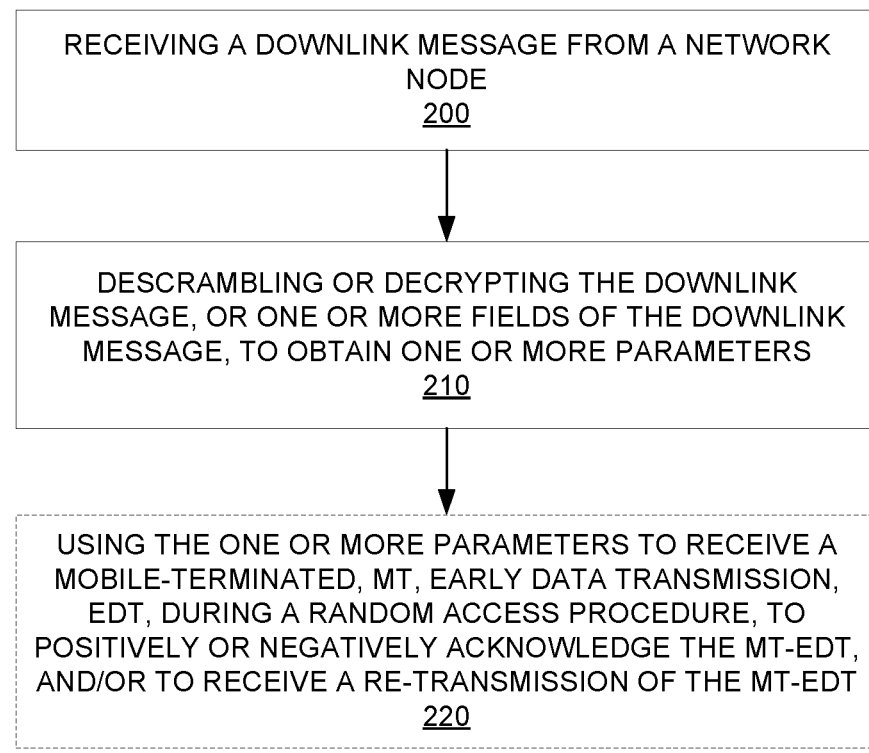
FIG. 5 is a logic flow diagram of a method performed by a wireless device according to some embodiments.

In view of the above modifications and variations, FIG. 5 depicts a method performed by a wireless device 12 in accordance with particular embodiments. The method includes receiving a downlink message 22 from a network node 20 (Block 200). The method may also include descrambling or decrypting the downlink message 22, or one or more fields 22A of the downlink message 22, to obtain one or more parameters 24 (Block 210). In some embodiments, the method further includes using the one or more parameters 24 to receive a MT-EDT 16 during a random access procedure 14, to positively or negatively acknowledge the MT-EDT 16, and/or to receive a re-transmission of the MT-EDT 16 (Block 220). That is, the further includes using the one or more parameters 24 to perform at least one action from any one or more of the following actions: receiving a MT-EDT 16 during a random access procedure 14; positively or negatively acknowledging the MT-EDT 16; and receiving a re-transmission of the MT-EDT 16.

In some embodiments, the random access procedure 14 includes the wireless device 12 transmitting a random access preamble to the network node 20 and receiving a random access response from the network node 20, and the MT-EDT is received when or before the wireless device receives the random access response.

In some embodiments, the random access procedure 14 is a contention-free random access procedure.

In some embodiments, the downlink message 22 is a paging message.

In some embodiments, the downlink message 22 is received using dedicated signaling while the wireless device 12 has a radio resource control, RRC, connection with the network node 20.

In some embodiments, the downlink message 22 is, or is received in accordance with scheduling information in, a random access response message of the random access procedure.

In some embodiments, the downlink message 22 is multiplexed with the MT-EDT 16.

In some embodiments, the descrambling or decrypting is performed based on security material, or a security context, shared between the wireless device 12 and the network node 20. In some embodiments, the method further comprises using the security material or security context to decrypt a secret identifier included in the downlink message 22. In this case, the descrambling or decrypting is performed using a key identified by the secret identifier.

In some embodiments, the key is an access stratum, AS, security key or a non-access stratum, NAS, security key.

In some embodiments, the descrambling or decrypting is performed based on a predefined descrambling or decrypting function shared between the wireless device 12 and the network node 20.

In some embodiments, the descrambling or decrypting is performed based on a device-specific identity that is specific to the wireless device 12. In some embodiments, the device-specific identity is a device-specific radio network temporary identifier, RNTI. In some embodiments, the device-specific identity is specific to MT-EDT.

In some embodiments, the descrambling or decrypting comprises descrambling or decrypting the downlink message 12.

In some embodiments, the descrambling or decrypting is based on a paging radio network temporary identifier, RNTI, specific to MT-EDT.

In some embodiments, the one or more parameters 24 include a radio network temporary identifier, RNTI. In some embodiments, the RNTI is a device-specific RNTI that is specific to MT-EDT.

In some embodiments, the one or more parameters 24 include: a contention-free random access preamble; or an identifier of, or index of, a contention-free random access preamble.

In some embodiments, the one or more parameters 24 include a parameter that indicates radio resources on which the MT-EDT is to be received, a parameter that indicates radio resources on which the wireless device is to transmit a positive or negative acknowledgement of the MT-EDT, and/or a parameter that indicates radio resources on which to receive the re-transmission of the MT-EDT.

In some embodiments, said using comprises using at least one of the one or more parameters 24 to receive the MT-EDT 16.

In some embodiments, using at least one of the one or more parameters 24 to receive the MT-EDT comprises using at least one of the one or more parameters 24 to: descramble the MT-EDT; descramble scheduling information that schedules the MT-EDT; and/or determine one or more radio resources on which to receive the MT-EDT.

In some embodiments, said using comprises using at least one of the one or more parameters 24 to positively or negatively acknowledge the MT-EDT. In some embodiments, using at least one of the one or more parameters 24 to positively or negatively acknowledge the MT-EDT comprises using at least one of the one or more parameters 24 to perform a random access channel transmission during the random access procedure and on a random access channel, wherein the random access channel transmission positively or negatively acknowledge the MT-EDT.

In some embodiments, the downlink message 22 is a paging message that indicates a contention-free random access preamble that the wireless device 12 is to use for the random access channel transmission, and wherein the MT-EDT is received after or in conjunction with the paging message.

In some embodiments, using at least one of the one or more parameters 24 to perform the random access channel transmission comprises using at least one of the one or more parameters 24 to scramble the random access channel transmission or to scramble a contention-free random access preamble conveyed by the random access channel transmission.

In some embodiments, using at least one of the one or more parameters 24 to perform the random access channel transmission comprises using at least one of the one or more parameters 24 to select a contention-free random access preamble to be conveyed by the random access channel transmission.

In some embodiments, said using comprises using at least one of the one or more parameters 24 to receive a re-transmission of the MT-EDT.

In some embodiments, using at least one of the one or more parameters 24 to receive a re-transmission of the MT-EDT comprises using at least one of the one or more parameters to monitor a downlink control channel for scheduling information that schedules the re-transmission of the MT-EDT.

Figure 6:
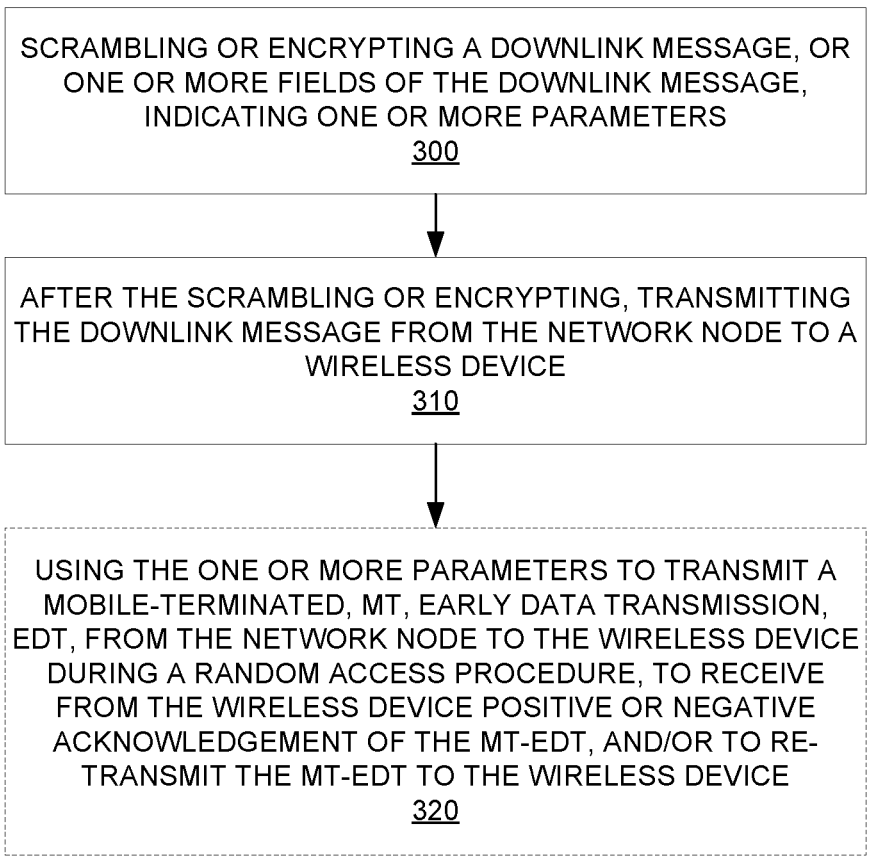
FIG. 6 is a logic flow diagram of a method performed by a network node according to some embodiments.

FIG. 6 depicts a method performed by a network node 20 in accordance with other particular embodiments. The method includes scrambling or encrypting a downlink message 22, or one or more fields 22A of the downlink message 22, indicating one or more parameters 24 (Block 300). The method may also include, after the scrambling or encrypting, transmitting the downlink message 22 from the network node 20 to the wireless device 12 (Block 310). In some embodiments, the method further includes using the one or more parameters 24 to transmit a mobile-terminated, MT, early data transmission, EDT, 16 from the network node 20 to the wireless device 12 during a random access procedure 14, to receive from the wireless device 12 positive or negative acknowledgement of the MT-EDT, and/or to re-transmit the MT-EDT to the wireless device 12 (Block 320). That is, the method in some embodiments further includes using the one or more parameters 24 to perform at least one action from any one or more of the following actions: transmitting a mobile-terminated, MT, early data transmission, EDT, 16 from the network node 20 to the wireless device 12 during a random access procedure 14; receiving from the wireless device 12 positive or negative acknowledgement of the MT-EDT; and re-transmitting the MT-EDT to the wireless device 12.

Note that although some embodiments have described the parameter(s) 24 as being specifically usable by the wireless device 12 to receive the EDT 16, to acknowledge the EDT 16, and/or to receive a retransmission of the EDT 16, the parameter(s) 24 more generally may be usable for controlling or performing uplink (UL) transmission and/or downlink (DL) reception.

Note also that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 7:
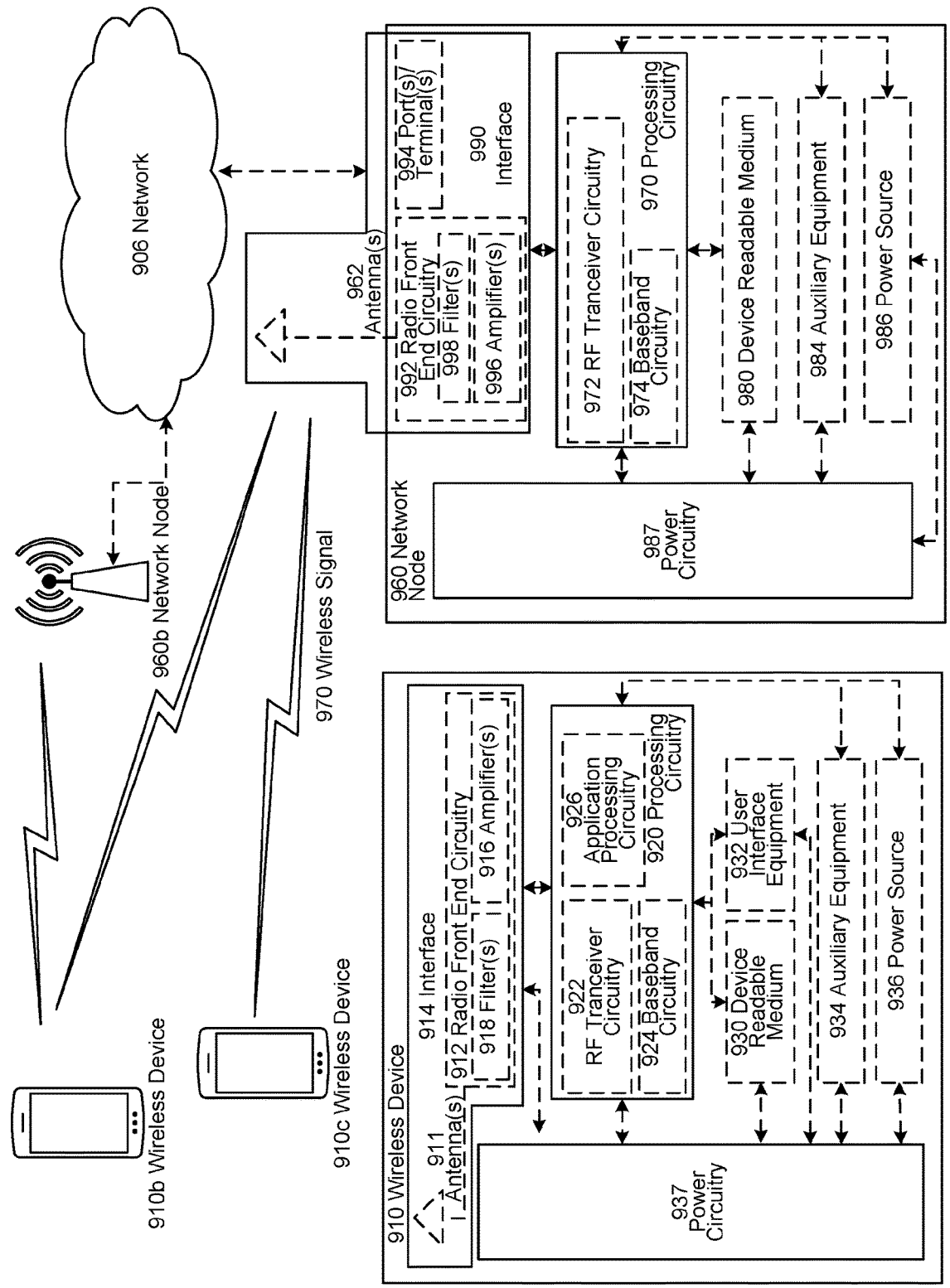
FIG. 7 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 2. FIG. 7 illustrates a wireless network similar to that of FIG. 2. For simplicity, the wireless network of FIG. 7 only depicts network 906, network nodes 960 and 960b, and WDs 910, 910b, and 910c. The network nodes 960 and 960b are similar to network node 20 of FIG. 2, and the WDs 910, 910b and 910c are similar to the wireless device 12 of FIG. 2. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 960 includes processing circuitry 970, device readable medium 980, interface 990, auxiliary equipment 984, power source 986, power circuitry 987, and antenna 962. Although network node 960 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include for example the steps of the method in FIG. 6.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units.

In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 7 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include the steps of the method of FIG. 5.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 8:
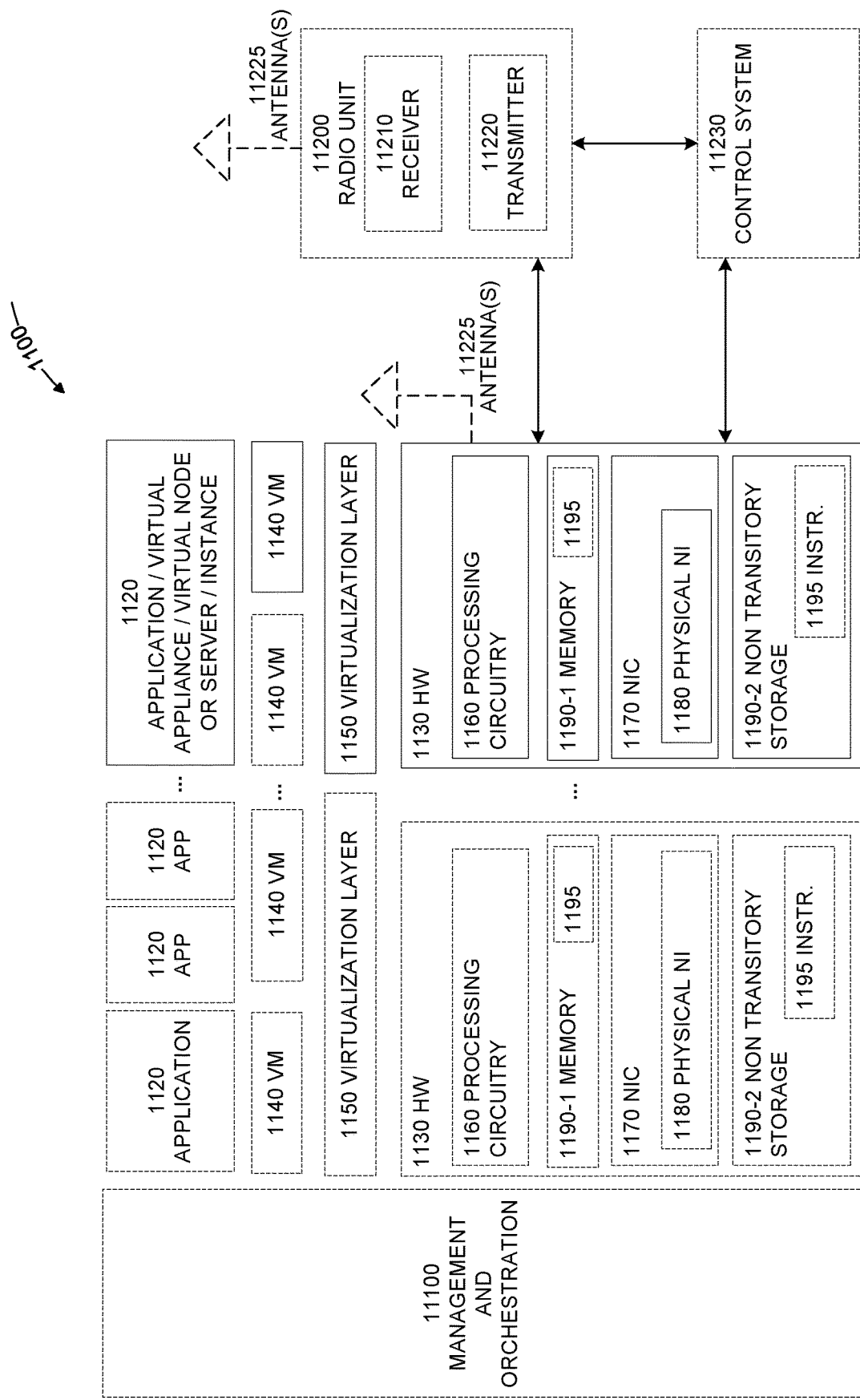
FIG. 8 is a block diagram of a virtualization environment according to some embodiments.

FIG. 8 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 8, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 8.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
   receiving a downlink message from a network node;
   descrambling or decrypting the downlink message, or one or more fields of the downlink message, to obtain one or more parameters, wherein said descrambling or decrypting is performed based on:
      security material, or a security context, shared between the wireless device and the network node; or
      a predefined descrambling or decrypting function shared between the wireless device and the network node; or
      a device-specific identity that is specific to the wireless device; or
      a paging radio network temporary identifier (RNTI) specific to MT-EDT; and
   using the one or more parameters to perform at least one action from any one or more of the following actions:
   receiving a mobile-terminated (MT) early data transmission (EDT) during a contention-free random access procedure, wherein the downlink message is received in accordance with scheduling information in a random access response message of the random access procedure;
   positively or negatively acknowledging the MT-EDT;
   receiving a re-transmission of the MT-EDT;
   wherein the contention-free random access procedure includes the wireless device transmitting a contention-free random access preamble to the network node and receiving a random access response from the network node, and wherein the MT-EDT is received when or before the wireless device receives the random access response; and
   using the security material or security context to decrypt a secret identifier included in the downlink message, wherein said descrambling or decrypting is performed using a key identified by the secret identifier.

2. The method of claim 1, wherein the downlink message is:
   a paging message; or
   a random access response message of the random access procedure.

3. The method of claim 1, wherein the one or more parameters include:
   a radio network temporary identifier (RNTI); or
   the contention-free random access preamble; or
   an identifier of, or index of, the contention-free random access preamble; or
   a parameter that indicates radio resources on which the MT-EDT is to be received, a parameter that indicates radio resources on which the wireless device is to transmit a positive or negative acknowledgement of the MT-EDT, and/or a parameter that indicates radio resources on which to receive the re-transmission of the MT-EDT.

4. The method of claim 1, wherein said using comprises using at least one of the one or more parameters to receive the MT-EDT, wherein using at least one of the one or more parameters to receive the MT-EDT comprises using at least one of the one or more parameters to perform at least one action from any one or more of the following actions:

descrambling the MT-EDT;
descrambling scheduling information that schedules the MT-EDT; and
determining one or more radio resources on which to receive the MT-EDT.

5. The method of claim 1, wherein said using comprises using at least one of the one or more parameters to positively or negatively acknowledge the MT-EDT, wherein using at least one of the one or more parameters to positively or negatively acknowledge the MT-EDT comprises using at least one of the one or more parameters to perform a random access channel transmission during the contention-free random access procedure and on a random access channel, wherein the random access channel transmission positively or negatively acknowledge the MT-EDT.

6. The method of claim 1, wherein the downlink message is a paging message that indicates the contention-free random access preamble that the wireless device is to use for the random access channel transmission, and wherein the MT-EDT is received after or in conjunction with the paging message.

7. The method of claim 1, wherein using at least one of the one or more parameters to perform the random access channel transmission comprises:
using at least one of the one or more parameters to scramble the random access channel transmission or to scramble the contention-free random access preamble conveyed by the random access channel transmission; or
using at least one of the one or more parameters to select a contention-free random access preamble to be conveyed by the random access channel transmission; or
using at least one of the one or more parameters to receive a re-transmission of the MT-EDT, wherein using at least one of the one or more parameters to receive a re-transmission of the MT-EDT comprises using at least one of the one or more parameters to monitor a downlink control channel for scheduling information that schedules the re-transmission of the MT-EDT.

8. A wireless device comprising:
communication circuitry; and
processing circuitry configured to:
receive a downlink message from a network node;
descramble or decrypt the downlink message, or one or more fields of the downlink message, to obtain one or more parameters, wherein said descrambling or decrypting is performed based on:
security material, or a security context, shared between the wireless device and the network node; or
a predefined descrambling or decrypting function shared between the wireless device and the network node; and
use the one or more parameters to perform at least one action from any one or more of the following actions:
receiving a mobile-terminated (MT) early data transmission (EDT) during a contention-free random access procedure, wherein the downlink message is received in accordance with scheduling information in a random access response message of the random access procedure;
positively or negatively acknowledging the MT-EDT;
receiving a re-transmission of the MT-EDT;
wherein the contention-free random access procedure includes the wireless device transmitting a contention-free random access preamble to the network node and receiving a random access response from the network node, and wherein the MT-EDT is received when or before the wireless device receives the random access response; and
using the security material or security context to decrypt a secret identifier included in the downlink message, wherein said descrambling or decrypting is performed using a key identified by the secret identifier.

9. The wireless device of claim 8, wherein the downlink message is:
a paging message; or
a random access response message of the random access procedure.

10. The wireless device of claim 8, wherein said descrambling or decrypting is performed based on a device-specific identity that is specific to the wireless device or based on a paging radio network temporary identifier (RNTI) specific to MT-EDT.

11. The wireless device of claim 8, wherein the one or more parameters include:
a radio network temporary identifier (RNTI); or
the contention-free random access preamble; or
an identifier of, or index of, the contention-free random access preamble; or
a parameter that indicates radio resources on which the MT-EDT is to be received, a parameter that indicates radio resources on which the wireless device is to transmit a positive or negative acknowledgement of the MT-EDT, and/or a parameter that indicates radio resources on which to receive the re-transmission of the MT-EDT.

12. The wireless device of claim 8, wherein said using comprises using at least one of the one or more parameters to receive the MT-EDT, wherein using at least one of the one or more parameters to receive the MT-EDT comprises using at least one of the one or more parameters to perform at least one action from any one or more of the following actions:
descrambling the MT-EDT;
descrambling scheduling information that schedules the MT-EDT; and
determining one or more radio resources on which to receive the MT-EDT.

13. The wireless device of claim 8, wherein said using comprises using at least one of the one or more parameters to positively or negatively acknowledge the MT-EDT, wherein using at least one of the one or more parameters to positively or negatively acknowledge the MT-EDT comprises using at least one of the one or more parameters to perform a random access channel transmission during the contention-free random access procedure and on a random access channel, wherein the random access channel transmission positively or negatively acknowledge the MT-EDT.

14. The wireless device of claim 8, wherein the downlink message is a paging message that indicates the contention-free random access preamble that the wireless device is to use for the random access channel transmission, and wherein the MT-EDT is received after or in conjunction with the paging message.

15. The wireless device of claim 8, wherein using at least one of the one or more parameters to perform the random access channel transmission comprises:
using at least one of the one or more parameters to scramble the random access channel transmission or to scramble the contention-free random access preamble conveyed by the random access channel transmission; or using at least one of the one or more parameters to select a contention-free random access preamble to be conveyed by the random access channel transmission; or using at least one of the one or more parameters to receive a re-transmission of the MT-EDT, wherein using at least one of the one or more parameters to receive a re-transmission of the MT-EDT comprises using at least one of the one or more parameters to monitor a downlink control channel for scheduling information that schedules the re-transmission of the MT-EDT.

16. A network node comprising:

communication circuitry; and processing circuitry configured to:

scramble or encrypt a downlink message, or one or more fields of the downlink message, indicating one or more parameters;

after scrambling or encrypting of the downlink message or the one or more parameters, transmit the downlink message from the network node to a wireless device, wherein said downlink message is descrambled or decrypted after receiving at the wireless device based on:

security material, or a security context, shared between the wireless device and the network node; or a predefined descrambling or decrypting function shared between the wireless device and the network node;

use the one or more parameters to perform at least one action from any one or more of the following actions:

transmitting a mobile-terminated (MT) early data transmission (EDT) from the network node to the wireless device during a contention-free random access procedure, wherein the downlink message is received in accordance with scheduling information in a random access response message of the random access procedure;

receiving from the wireless device positive or negative acknowledgement of the MT-EDT;

re-transmitting the MT-EDT to the wireless device, wherein the contention-free random access procedure includes the network node receiving a contention-free random access preamble from the wireless device and transmitting a random access response to the wireless device, and wherein the MT-EDT is transmitted when or before the network node transmits the random access response; and using the security material or security context to decrypt a secret identifier included in the downlink message, wherein said descrambling or decrypting is performed using a key identified by the secret identifier.

* * * * *